(12) United States Patent
Epstein et al.

(10) Patent No.: US 8,516,480 B1
(45) Date of Patent: Aug. 20, 2013

(54) ENABLING OFFLINE WORK IN A VIRTUAL DATA CENTER

(75) Inventors: Kevin Epstein, Los Altos, CA (US); Uri Gilad, Nes Ziona (IL); Ophir Kra-OZ, Tel Aviv (IL); Avner Rosenan, Tel Aviv (IL)

(73) Assignees: CloudShare, Inc., San Mateo, CA (US); CloudShare Ltd., Tel Aviv (IL)

( * ) Notice: Subject to any disclaimer, the term of this patent is extended or adjusted under 35 U.S.C. 154(b) by 137 days.

(21) Appl. No.: 12/906,882

(22) Filed: Oct. 18, 2010

Related U.S. Application Data

(60) Provisional application No. 61/252,866, filed on Oct. 19, 2009.

(51) Int. Cl.
*G06F 9/455* (2006.01)
*G06F 12/16* (2006.01)

(52) U.S. Cl.
USPC .............................................. 718/1; 711/162

(58) Field of Classification Search
None
See application file for complete search history.

(56) References Cited

U.S. PATENT DOCUMENTS

| 8,166,477 | B1 * | 4/2012 | Tormasov ........................... 718/1 |
| 2008/0201414 | A1 * | 8/2008 | Amir Husain et al. ........ 709/203 |
| 2010/0049930 | A1 * | 2/2010 | Pershin et al. ................. 711/162 |

* cited by examiner

*Primary Examiner* — Andy Ho
*Assistant Examiner* — Abdou Seye
(74) *Attorney, Agent, or Firm* — Fenwick & West LLP

(57) ABSTRACT

Virtualization snapshots are utilized for efficiently synchronizing virtual machines present on a client system and a server system. A snapshot of a virtual machine (VM) is taken by the client system before making modifications to the VM. The modifications to the VM are stored by the virtualization snapshot separate from the VM itself. The modified portions of the VM are communicated by the client system to the server system. The server system applies the modifications to a locally stored VM that corresponds to the original VM on the client system. The modified VM on the server system matches the modified VM on the client. As a result synchronization between the VMs on client system and the server system is obtained without transferring the entire VM multiple times. The server system performs format conversions between a format of the client system and the server system on the VM.

20 Claims, 4 Drawing Sheets

ENABLING OFFLINE WORK IN A VIRTUAL DATA CENTER

CROSS REFERENCES TO RELATED APPLICATIONS

This application claims the benefit of U.S. Provisional Application No. 61/252,866, filed on Oct. 19, 2009, which is incorporated by reference in its entirety.

BACKGROUND

1. Field of Art

The disclosure generally relates to the field of cloud computing and specifically to working offline with a virtual data center in a cloud computing environment.

2. Description of the Field of Art

Cloud computing provides virtualized resources as a service over a network, for example, the internet. The cloud computing infrastructure comprises services delivered through data centers built on servers. Cloud computing allows efficient utilization of resources, for example, storage, memory, processing, and bandwidth across clients. Server virtualization techniques are typically used to provide virtual machines (VMs) to users to work with.

Also, typically computing power of the client device is significantly less than the computing power of the servers in the data center. Hence the same task may take much less time when executed on the server of the data center compared to the client device. A user of a client device prefers to execute resource intensive tasks on the server of the data center if possible.

Communication over the internet between a client device and a server in a data center typically allows faster download speed but slower upload speed. For example, a client device downloading a large file from the server over the internet may be able to download the files in significantly less time compared to the time taken to upload the same files from the client device to the server.

Examples of tasks that can take significant amount of time when performed in a cloud computing environment include tasks that require uploading of large amount of data to the server in a data center. For example, a user may need to install several applications in the environment that the user is working with in the cloud computing environment. The applications may be available to the user on media, for example, discs for software installation that can be loaded into the user's computer. Installing the applications on the virtual machine conventionally requires the user to upload large files from the user's computer to the server. Furthermore, the installation process may be difficult to execute in the server of the data center if the installation needs to disable the network of the machine.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1) illustrates one embodiment of components of an example machine able to read instructions from a machine-readable medium and execute them in a processor (or controller).

Figure 1:
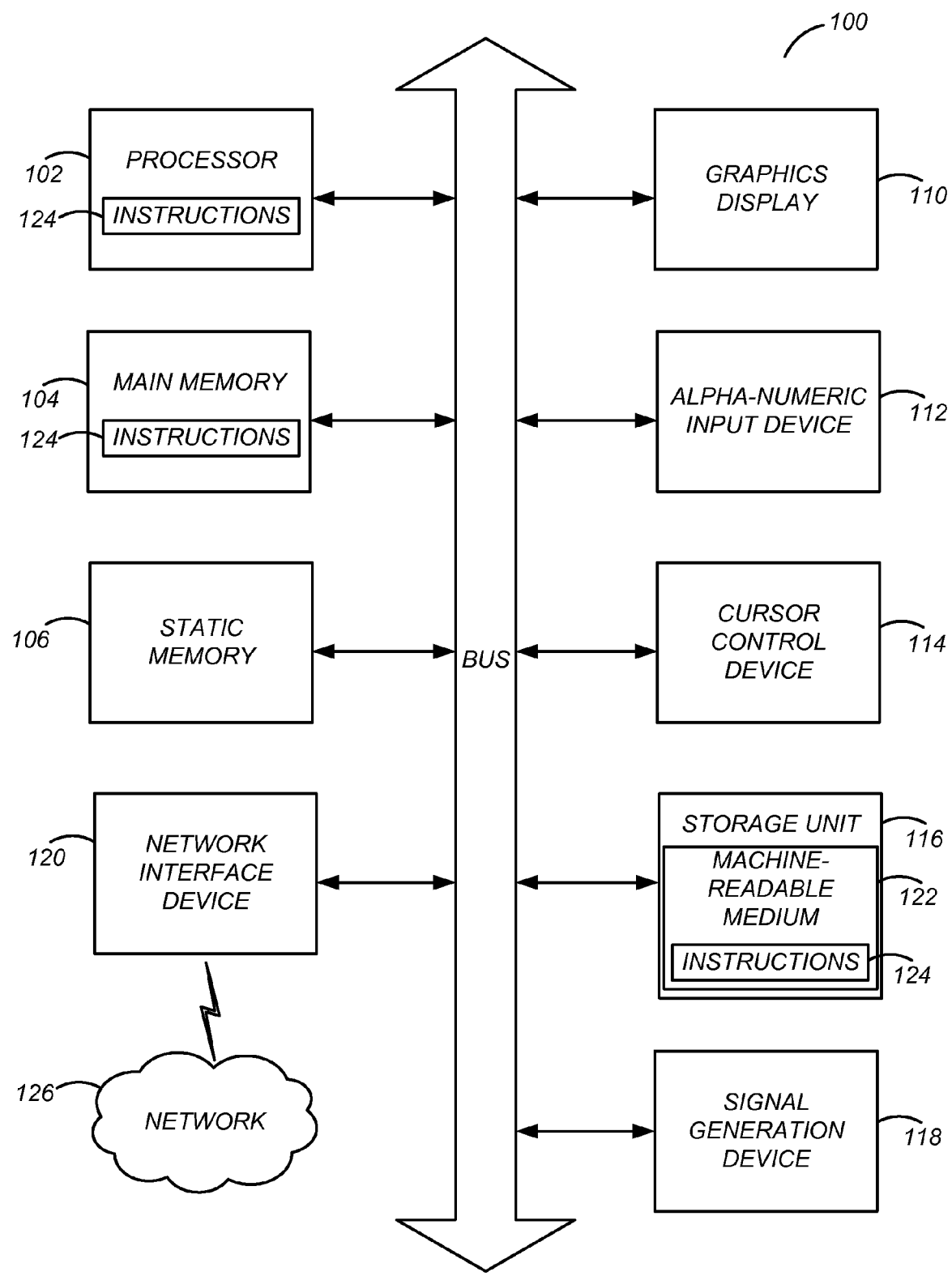

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium allows modifications to virtual machines (VMs) on a data center based on information available in a client device. The client device downloads a virtual machine (VM) from the data center. The client device takes a snapshot of the VM. The management of snapshot is performed by keeping the original VM without modifications and maintaining the modified portions of the VM separate from the original VM as the VM gets modified. The client device makes modifications to the VM and obtains the difference between the original VM that was downloaded from the data center and the modified VM from the snapshot. The difference between the original VM downloaded from the data center and the modified VM are uploaded to the data center and applied to the original VM at the server. Applying the changes to the original VM on the server results in a VM at the server that corresponds to the modified VM on the client.

Another embodiment of a disclosed system, method and computer readable storage medium allows modification of VM stored in a data center based on information stored in the client device, without downloading VM from the data center to the client device. The client device has a version of the original VM that corresponds to the VM in the data center. The client device uploads files to the data center, for example, applications that are needed to modify a VM. The original VM is modified in the data center based on the files uploaded from the client and/or using other files available in the data center. The modified VM is compared with the original VM to compute the differences between the two VMs. The differences between the modified VM and the original VM in the data center are downloaded to the client device and applied to the original VM on the client device. Hence, the VM on the client device is modified and correspond to the modified VM on the server.

Computing Machine Architecture

In the example disclosed systems and processes are structured to operate with machines to provide such machines with particular functionality as disclosed herein. FIG. (FIG. 1 is a block diagram illustrating components of an example machine configured to read instructions from a machine-readable medium and execute them through one or more processors (or one or more controllers). Specifically, FIG. 1 shows a diagrammatic representation of a machine in the example form of a computer system 100 within which instructions 124 (e.g., software) cause the machine to perform any one or more of the methodologies discussed herein when those instructions are executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

System Architecture

Figure 2:
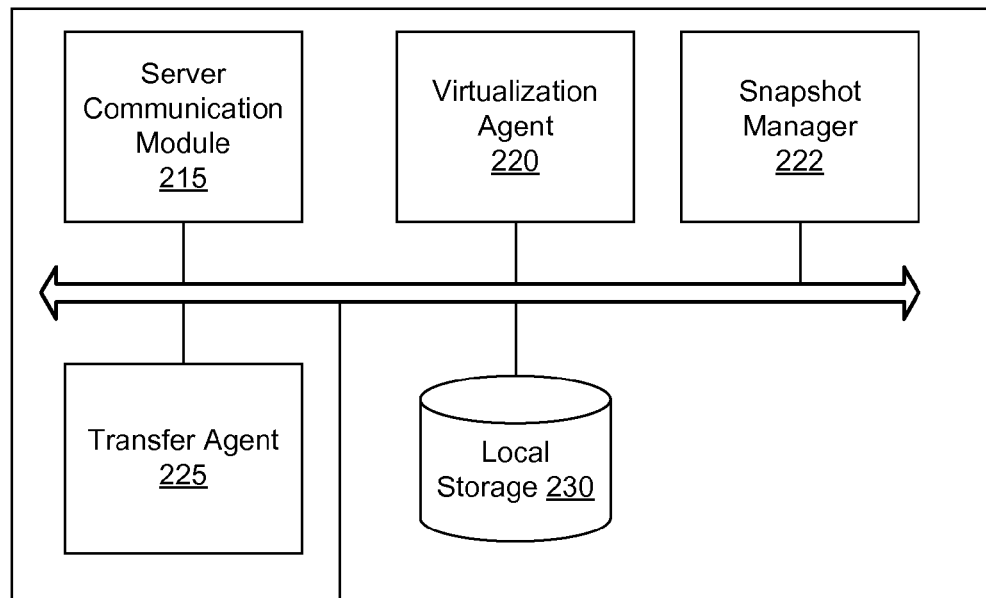
FIG. 2 is a diagram illustrating one embodiment of the system architecture that allows a user to make modifications to virtual machine files on the data center.
Figure 2:
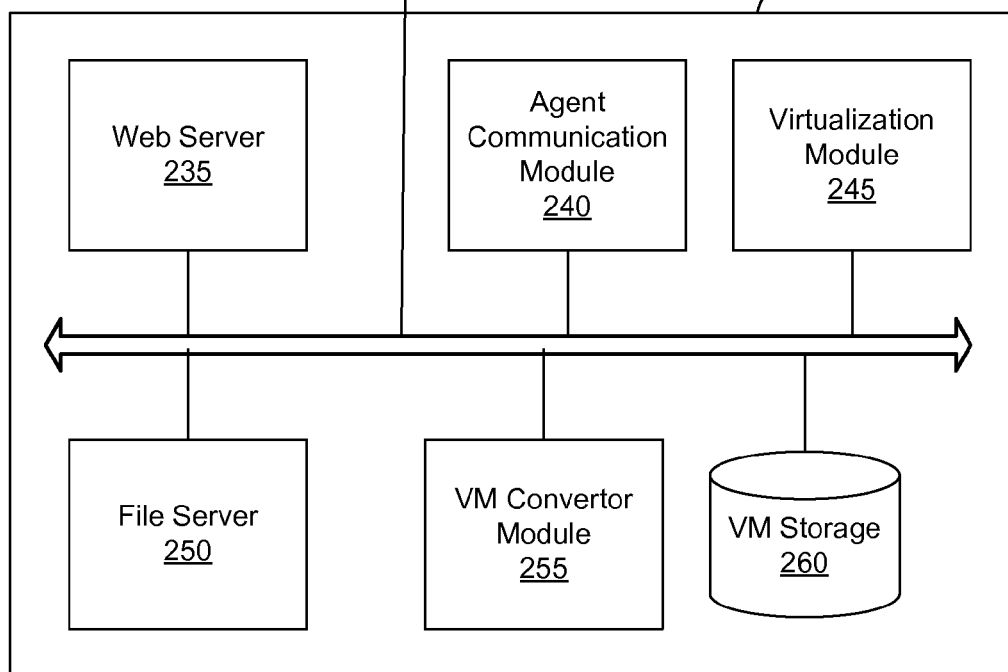

FIG. 2 is a diagram of one embodiment of a system architecture that allows a user to make modifications to virtual machine files in a data center. The system environment comprises one or more client devices 205, one or more data centers 200, and a network 210. A user interacts with the client device 205 that communicates with the data center 200 via the network 210. In some embodiments, the data centers are virtual data centers and the physical location of the hardware used for the virtual data center or the type and configuration of the hardware used for the virtual data center is transparent to the user. In alternative configurations, different and/or additional modules can be included in the system.

The client devices 205 comprise one or more computing devices that can receive user input and can transmit and receive data via the network 210. For example, the client devices 205 may be desktop computers, laptop computers, or any other device including computing functionality and data communication capabilities. Other client devices are considered to fall within the scope of the present invention including, but not limited to, hand held devices, set top terminals, mobile handsets, PDAs, etc. The client devices 205 are configured to communicate via network 210, which may comprise any combination of local area and/or wide area networks, using both wired and wireless communication systems.

The virtual data center 200 includes a web server 235, an agent communication module 240, a virtualization module 245, a file server 250, a VM converter module 255, snapshot manager 222, and a VM storage 260. Conventional components such as network interfaces, security mechanisms, load balancers, failover servers, management and network operations consoles, and the like are not shown so as to not obscure the details of the system. In alternative configurations, different and/or additional modules can be included in the virtual data center 200. Multiple virtual data centers 200 can run on a single server with suitable capacity.

The web server 235 links the data center 200 via the network 210 to one or more client devices 205. The web server 235 serves web pages, as well as other web-related content, such as Java, Flash, XML, and so forth. The agent communication module 240 performs communications with the transfer agent 225 on the client device 205. The file server 250 performs operations related to transfer of files between the data center 200 and the client device 205 using the network 210. Functionality of the file server 250 includes access control of the files.

The virtual machine (VM) storage 260 provides persistent storage for data in the data center 200, for example, for storing files related to VMs and files generated by snapshots. Files downloaded by the client device 205 from the data center 200 and files uploaded to the data center 200 by the client device 205 are stored in the VM storage 260. The VM convertor module converts a VM to a target virtualization platform. The virtualization module 245 provides the runtime support for a virtual machine. Examples of vendor specific virtualization modules 245 include MICROSOFT's HYPERV and VMWARE's ESX SERVER. The snapshot manager 222 manages snapshots of VMs by storing the modifications to the VM separate from the original unmodified VM. A set of VM files can include the following kinds of files. (1) A configuration file of the virtual machine that contains textual description of the configuration of VM (for example, a file with .vmx extension). (2) One or more machine disk files corresponding to the VM (for example, a file with a .vmdk extension). Typically, these files can be large, for example, multiple gigabytes in size.

The client device 205 includes a server communication module 215, a virtualization agent, a transfer agent 225, and local storage 230. In alternative configurations, different and/or additional modules can be included in the client device 205. The virtualization agent 220 performs operations related to virtualization, for example, validation of a VM and taking snapshots of a VM. The server communication module handles communications with the data center 200 over the network 210. The transfer agent 225 implements download and upload functionality and executes (or performs) file transfers between the client device 205 and the data center 200. The transfer agent 225 may perform validity checks on the files being transferred. The transfer agent 225 may perform transfers of files even while the virtualization agent is down since transfers of large files can take a long time. In certain embodiments, the transfer agent 225 has ability to recover from a network disconnect during the transfer of the data or the ability to support multiple connections in parallel.

Download/Upload of Modified Virtual Machines

In one embodiment a process to download/upload VMs minimizes bandwidth usage during the data transfer. Typically the bandwidth available for downloading files from the data center 200 to the client device 205 are higher than the bandwidth available for uploading files from the client device 205 to the data center 200. Therefore, the time taken to download a large file can be less when downloaded from the data center 200 to the client device 205, but significantly large when the same file is uploaded from the client device 205 to the data center 200. The following processes can modify VMs available in the data center 200 based on information available in the client device 205 without requiring an upload of the VM from the client device to the data center 200.

Figure 3:
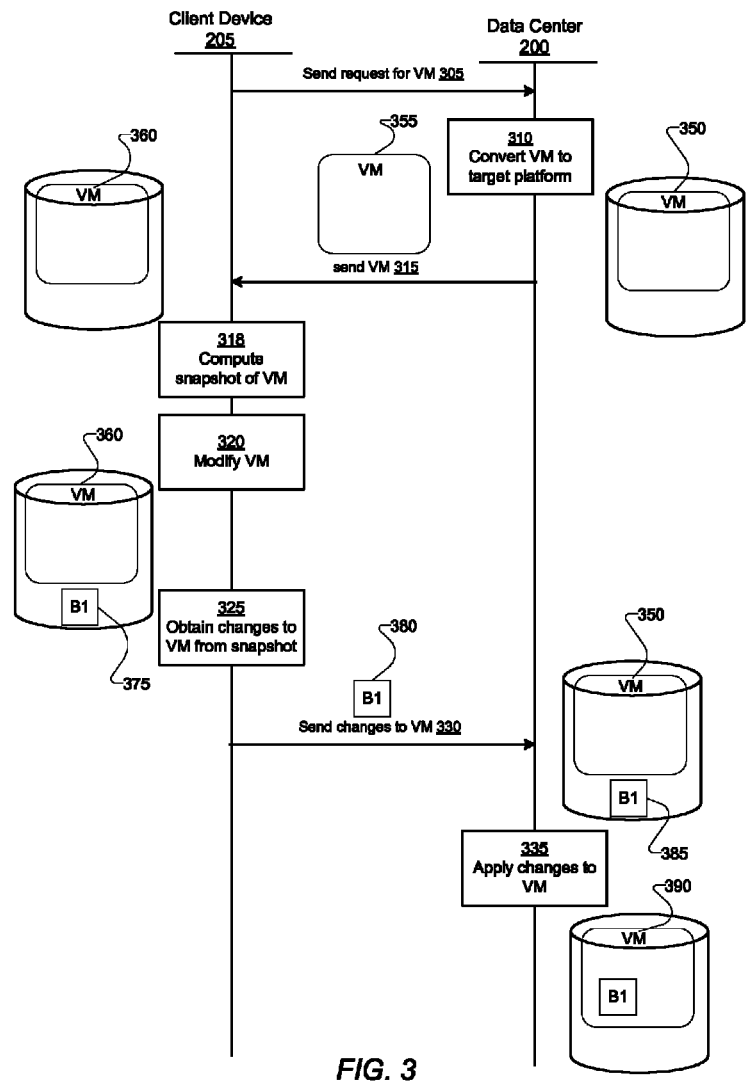
FIG. 3 is an interaction diagram illustrating one embodiment of a process in which a client device makes modifications to a VM and uploads the changes to the data center.

FIG. 3 is an interaction diagram of one embodiment of a process in which a client device makes modifications to a VM and uploads the changes to the data center. The client device 205 sends 305 a request to the data center for a VM (a VM is represented by a set of VM files) to be downloaded from the data center. The request may identify a target platform to which the data center converts 310 the VM available before transferring the VM to the client device. In an embodiment, the data center sends the VM without any conversion to a target platform and lets the client device convert the VM to the target platform. FIG. 3 shows the VM 350 stored in the VM storage 260 in the data center 200. The VM 355 is being transferred using the network 210 to the client device 205. The amount of data being transferred 355 is large and the transfer of the data can be a slow operation. The VM 360 received by the client device is stored in the local storage 230.

A snapshot of the VM is computed 318 such that the original VM 360 without modifications is maintained and the modifications to the VM are stored in files separate from the original VM 360 by the snapshot manager. Based on information available in the client device 205, the VM 360 is modified 320. The modification of the VM may involve interaction with a user via a user interface provided by the client device 205. Information used for modifying the VM 360 includes applications or other data available in the local storage 230 in the client device 205. The modifications of the VM 360 performed in the client device results in changes 375 to the VM stored in the local storage 230 by the snapshot. The snapshot manager 222 may store the modifications to the VM 375 separate from the original unmodified VM 360. The snapshot manager 222 uses the two sets of information, the original VM 360 and the modifications 375 to reconstruct the modified VM for users of the client device 205.

The differences between the modified VM and the original VM 360 can be obtained 325 from the snapshot manager 222 using the snapshot of the VM. The result of obtaining 325 the changes made to the VM 365 by modifying 320 the VM 360 is represented as data 375 stored in the local storage 230, for example, as a set of data blocks. In an embodiment, the data 375 representing the changes between the modified VM and the original VM is compressed to improve efficiency of storage or transmission of the data. The client device 205 sends 330 the changes 375 to the VM to the data center 200. The binary data corresponding to the changes 375 to the VM being transferred to the data center 205 is indicated as 380 in FIG. 3. Since upload of data can be a slow process, embodiments allow ability to recover from a network disconnect during the transfer of the data or the ability to support multiple connections in parallel.

The changes to the modified VM are received by the data center 200 and stored in the VM storage, indicated by 385 in FIG. 3. The changes received by the data center 200 are applied 335 to the VM 350 available at the data center 200. In an embodiment, a copy of the VM 350 may be made before applying the changes 385, so as to preserve the original VM 350. Alternatively, the changes may be applied to the copy of the VM. Because the amount of storage available in the data center 200 is significantly large compared to the storage available in a client device 205, multiple copies of the VM can be kept in the data center 200. Applying 335 the changes 385 to the VM 350 stored in the VM storage 260 results in a modified VM 390. The modified VM 390 in the data center 200 has the same information as the modified VM 365 in the client device 205. For example, in an embodiment, the VM 390 may store binary data same as the VM 365. Hence, the above process manages to build a modified VM in the data center without requiring a transfer of the entire VM from the client device 205 to the data center 200.

A modification of the VM causes updates in the VM's virtual hard drive (based on the context, a VM refers either to the virtual machine that is executing or the data stored in the virtual machine's virtual hard drive). A snapshot of the VM is created in the client device before modifying the VM. The snapshot keeps a version of the VM before any modifications and subsequently maintains the changes made to portions of the VM. For example, a data block may be copied before it is modified and the changes made to the copied data block. As a result, the modified VM is maintained using the original VM along with additional storage used only for the changed blocks. Hence, use of snapshot allows efficient use of the storage space. A conventional implementation not based on the snapshot technology may keep multiple copies of the VM, for example, the original copy of the VM as well as the modified copy. Furthermore, computing the diff (a diff between two data sets represents the differences between the two data sets, for example the diff between two files represents the differences between the two files) between the two VMs (representing the changes between the original VM and the modified VM) can take a significantly large time to execute besides requiring large amount of storage to maintain multiple copies of the VM. The snapshot manager 222 maintains the snapshot of the VM by maintaining a single copy of the VM, i.e., the original unmodified copy of the VM. Subsequent changes to the VM are stored as files separate from the original VM and are automatically computed by the snapshot manager 222. Therefore, use of snapshot of the VM provides efficient storage of the modifications to the VM as well as a computationally efficient mechanism of obtaining the modifications to the VM without requiring an expensive operation that compares the two VMs.

In some embodiments, a hash value is generated based on the VM before taking the snapshot of the VM in the client device 205. The hash value is stored in the local storage 230. After the VM is modified, for example by installing applications on the VM, the hash value of the original VM without the modifications is computed again and compared against the stored snapshot value. This ensures that the VM was not modified due to any user error or tampered with. If it is realized that the original VM was changed due to some error, an error message is reported to the user. In this case, the changes 375 computed are not based on the original VM 360 that was obtained from the data center 200 and are not meaningful if sent to the data center. The above process may have to be repeated in case of above errors.

In some embodiment, the information sent 330 from the client device 205 to the data center 200 includes tags that state the type of desktop virtualization client that was used by the client device 205. If the server performed the step 310 of converting the VM to a target platform, the server may have to perform a conversion from the VM 390 back to the platform used in the production environment in the data center.

Figure 4:
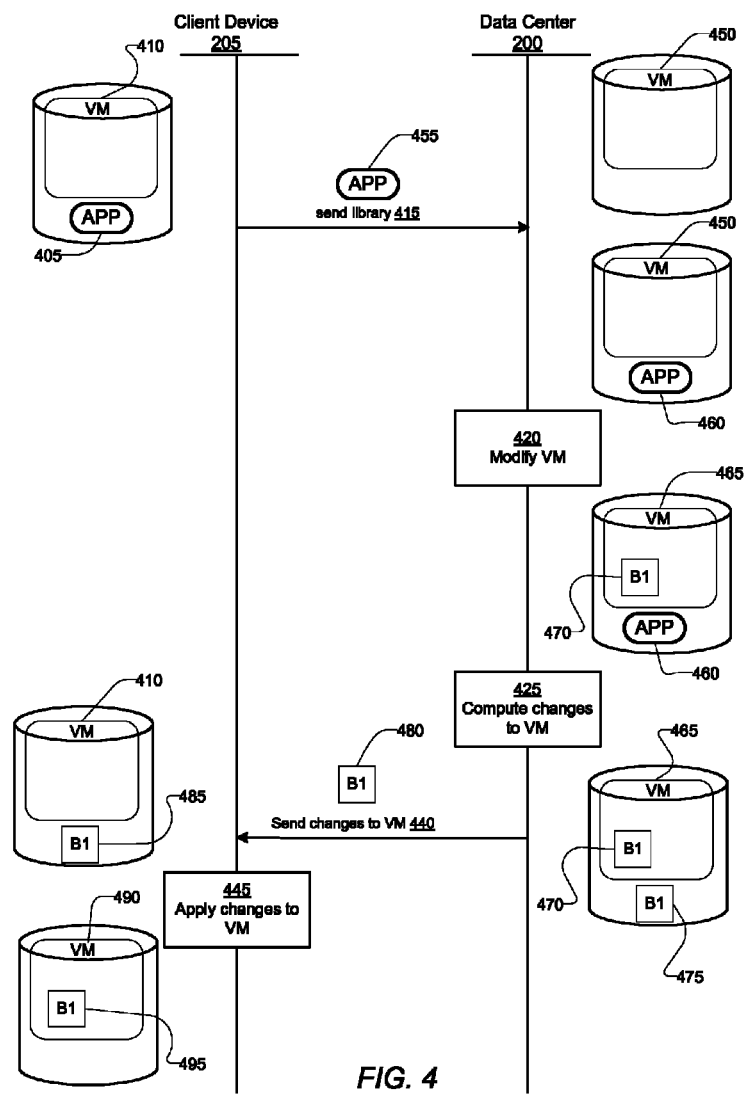
FIG. 4 is an interaction diagram illustrating one embodiment of a process in which the modifications to the VM are made on the server and the changes downloaded to the client device.

FIG. 4 is an interaction diagram of a process in which the modifications to the VM are made on the server and the changes downloaded to the client device. The process shown in FIG. 4 avoids any download of the VM from the data center 200 to the client device 205 or any upload of a VM from the client device 205 to the data center 200. FIG. 4 does not show the steps for sending 305 a request for VM and the conversion 310 of the VM to a target platform by the data center 200 as shown in FIG. 3. However, these steps may be performed in certain embodiments in the scenario illustrated in FIG. 4.

The VM 450 is the original VM that needs to be modified based on information available in the client device 205. The information needed for modifying the VM 450 in the data center may include files, for example, libraries 405 available in the client device 205. The VM can be modified, for example, by configuring installed applications, changing background image, downloading files from the internet, or by executing operating system commands that may be stored in history files. FIG. 4 assumes that the client device has a VM 410 that correspond to the VM 450 in the data center 200. The client device sends 415 any applications required for modification of the VM available in the client device to the data center 200 for use at the data center 200. The applications 405 are indicated as being transferred as data 455 using the network 210 and received by the data center 200. The data 455 received by the data center 200 is stored as files 460 in the VM storage 260.

The applications 460 and possibly other information available in the data center 200 may be used to modify 420 the VM 450. User interaction may be involved in the process of modifying the VM 450 using files 460. The VM 450 may be copied before applying any changes to the VM in order to retain a copy of the VM. Alternatively, the changes may be applied to the copy of the VM. The modification 420 of the original VM 450 to the modified VM 465 may cause changes in the binary data corresponding to the VM 450 stored in the VM storage 260. The difference between the modified VM 465 and the original VM 450 is indicated by the portion 470 of the VM 465. The portion 470 corresponds to binary data stored on the VM storage 260 within the data corresponding to VM 465 and may be available as data blocks. The changes between the modified VM 465 and the original VM 450 are computed 425. The result of the computation 425 may be stored as the data 475 in the VM storage 260. A hash value of the original VM before modifications may be computed and stored. A hash value may be computed based on a hash function, for example, SHA-1 function. After modifications to the VM are made, the hash value is recomputed based on the unmodified VM to make sure that the VM has not been tampered with. If the original VM was tampered with, a different hash function is obtained with a very high probability.

The data 575 corresponding to the changes made to the VM 450 is sent 440 to the client device 205. The data 475 being transferred over the network 210 is indicated as data 480 in FIG. 4. The data 480 received at the client device 205 is stored as data 485 in the local storage 230. The changes corresponding to the data 485 are applied 445 to the VM 410 stored on the client device 205 resulting in the modified VM 490. The changes corresponding to data 485 are represented as data 495 within the VM 490 stored on the client device 205. Hence, the above process manages to build a modified VM in the client device 205 without requiring an upload of the entire VM from the client device 205 to the data center 200 or a download of the VM from the data center 200 to the client device 205.

Example Operational Embodiment

An example operational embodiment based on the above processes is described in further detail below. VMs are exported from a VCENTER Infrastructure format to VMWARE Workstation/Server format, and imported back again after they are changed by a convertor. The downloader/uploader utility allows users to download a VM from the server, change it and then use it to update the main version of the machine on the server. After the conversion two files are generated: (1).vmx file which contains all the textual configurations of the machine; (2).vmdk file which represents the machines disk (and is probably the largest file for any machine).

Since any changes to the disk are stored in the .vmdk file, and each snapshot creates a separate .vmdk file which stores only differences from its parent, the first thing to do after exporting/converting the virtual machine is to create a new snapshot. Because the original .vmdk file is already stored on the server, only changes to the new .vmdk (and any snapshots taken later by the user) will be uploaded back; the original file remains untouched.

The first snapshot should be taken for the newly created, powered-off machine. It is possible through both VMWARE Workstation's UI and its command line application (vmrun. exe), and therefore can be achieved through APIs. By snapshotting the powered-off machine, minimal changes are done to the disk and the newly created .vmdk file is less than 1 MB in size (for example, using WINDOWS XP and WINDOWS 2003 SERVER) in comparison to the several MBs that a similar powered-on operation creates.

Several new files are created in this process, all of them are relatively very small in size: (1) A new .vmdk file; (2).vmsd which always contains the textual metadata of the current snapshot; (3).vmsn which contains the actual snapshot configuration; (4).vmxf which contains extended textual configurations, including a random unique 15-byte hex string. At this point all the files should be downloaded by the client-side application. A VM cannot be exported while it is powered-on.

After the user finishes downloading the exported virtual machine, it is completely under the user's control. It is assumed that the user may change anything in the configuration and in the guest operating system. The only thing that does not change is the original .vmdk file, because a new snapshot was created before the download.

The user has two choices—revert back to our snapshot or continue with the current state. In both cases the user's interaction begins with the machine powered-off. In the first case, a new .vmdk file with a different name is created and the snapshot .vmdk file supplied by the server is deleted. This is because any .vmdk file (except for the original one) contains only changes made after the snapshot was taken; any revert to a snapshot actually discards the last .vmdk file. In the second case, changes will be saved in the same snapshot .vmdk file supplied by the server.

The user can then apply any changes to the VM, and create as many snapshots as he desires. When the user decides to upload the modified machine back to the server, all the changes from the original files are uploaded. This includes any .vmdk and .vmsn files which are different from those on the server, as well as the updated .vmx configuration file. The size of these files may vary greatly according to the changes made by the user, but will usually be much smaller than the original .vmdk file (which should not be uploaded). This is done even if the user did not create any new snapshots (in this case all changes are stored in the snapshot .vmdk file supplied by the server), because we ensure that there is at least one snapshot before the user downloads the machine.

Note that the converter cannot process VMs that are powered on. The client-side application must therefore enforce the power-off (not suspension) of the virtual machine before uploading. After the client-side application finished uploading the modified files (.vmx, .vmsn(s), .vmdk(s)) the converter can be used to import the VM back into the server.

The user may decide to update the same machine again, and therefore all the uploaded files should be saved along with the original .vmdk file, and checked during later update sessions to see if they where modified. Also, the user may create several branches of snapshots, and only one of them should be chosen by the client-side application (all the snapshots of a single cascade from the root snapshot should be uploaded, because each one contains disk data differences from its parent).

It is recommended to upload the .vmx file from the client, since it is also modified during work on the virtual machine, and the conversion may fail if the wrong file is supplied. Note that the import process may not update the original VM, but instead creates a new machine. The converter should be configured to install VMware tools during the import as well. This installation will also be completed the next time the imported machine is powered on, and may require a reboot.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein, for example, the process illustrated and described with respect to FIGS. 3, and 4.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output.

Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a method for enabling offline work in a data center in a cloud computing environment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A computer implemented method for synchronizing changes in virtual machines (VMs) between two or more systems, the method comprising:

obtaining, by a first system, a virtualization snapshot of a source VM;

receiving, by the first system, instructions for execution, wherein the execution is performed using the source VM;

executing, by the first system, the received instructions resulting in modifications of the source VM, wherein the virtualization snapshot stores modified portions of the source VM separate from the source VM, comprising:
  determining whether execution of the received instructions causes modification of a data block of the source VM; and
  storing a modified data block on the first system separate from the source VM responsive to determining that the execution of the received instructions causes modification of the data block;
sending, by the first system, the modified portions of the source VM to a second system comprising a destination VM, wherein the destination VM matches the source VM before the modifications;
receiving, by the second system, the modified portions from the first system; and
applying, by the second system, the modified portions to the destination VM to obtain a modified destination VM that matches the modified source VM.

2. The computer implemented method of claim 1, further comprising:
  determining a first hash value based on the source VM before taking the virtualization snapshot;
  determining a second hash value based on an original version of the source VM stored by the virtualization snapshot, responsive to execution of the received instructions;
  comparing the second hash value with the first hash value; and
  reporting an error responsive to determining a mismatch between the second hash value and the first hash value.

3. The computer implemented method of claim 1, further comprising:
  receiving, by the first system, the source VM from the second system prior to taking the virtualization snapshot of a source VM.

4. The computer implemented method of claim 3, further comprising:
  obtaining, by the second system obtaining the source VM by performing a conversion of a VM from a first format compatible with the second system to a second format compatible with the first system; and
  performing, by the second system, a conversion of the modified destination VM from the second format to the first format.

5. The computer implemented method of claim 1, wherein the modified portions comprise data blocks of the source VM that are modified as a result of executing the received instructions.

6. The computer implemented method of claim 1, wherein the first system is a client machine and the second system is a server machine.

7. A computer implemented method for synchronizing changes in virtual machines (VMs) between two or more systems, the method comprising:
  taking a virtualization snapshot of a source VM;
  receiving instructions for execution, wherein the execution is performed using the source VM;
  executing the received instructions resulting in modifications of the source VM, wherein the virtualization snapshot stores modified portions of the source VM separate from the source VM, comprising:
    determining whether execution of the received instructions causes modification of a data block of the source VM; and
    storing a modified data block on the first system separate from the source VM responsive to determining that the execution of the received instructions causes modification of the data block; and
  sending the modified portions of the source VM to a remote system comprising a destination VM, wherein the remote system applies the modified portions to the destination VM to obtain a modified destination VM that matches the modified source VM.

8. The computer implemented method of claim 7, further comprising:
  determining a first hash value based on the source VM before taking the virtualization snapshot; and
  determining a second hash value based on an original version of the source VM stored by the virtualization snapshot responsive to execution of the received instructions;
  comparing the second hash value with the first hash value; and
  responsive to determining a mismatch between the second hash value and the first hash value, reporting an error.

9. The computer implemented method of claim 7, further comprising:
  receiving the source VM from the remote system prior to taking the virtualization snapshot of a source VM.

10. The computer implemented method of claim 9, wherein the remote system performs a conversion of the modified destination VM to a format compatible with the remote system.

11. The computer implemented method of claim 7, wherein the modified portions comprise data blocks of the source VM that are modified as a result of executing the received instructions.

12. A computer implemented method for synchronizing changes in virtual machines (VMs) between two or more systems, the method comprising:
  sending a source VM to a remote system, wherein the remote system:
    takes a virtualization snapshot of a source VM;
    executing instructions resulting in modifications of the source VM, wherein the virtualization snapshot stores on the remote system, modified portions of the source VM separate from the source VM, the storing comprising:
      determining whether execution of the instructions causes modification of a data block of the source VM; and
      responsive to determining that the execution of the instructions causes modification of the data block, storing a modified data block on the remote system separate from the source VM;
  receiving the modified portions from the remote system; and
  applying the modified portions to a destination VM to obtain a modified destination VM that matches the modified source VM of the remote system.

13. The computer implemented method of claim 12, further comprising:
  performing a conversion of the destination VM from a first format compatible with the remote system to a second format compatible with the first system to obtain the source VM; and
  the remote system performs a conversion of the modified destination VM from the second format to the first format.

14. The computer implemented method of claim 12, wherein the modified portions comprise data blocks of the source VM that are modified as a result of executing the instructions.

15. The computer implemented method of claim 12, wherein the remote system is a client machine.

16. A computer-implemented system for synchronizing changes in virtual machines (VMs) between two or more systems, the system comprising:
   a computer processor; and
   a computer-readable storage medium storing computer program modules configured to execute on the computer processor, the computer program modules comprising:
      a snapshot manager module configured to
         take a virtualization snapshot of a source VM;
      a virtualization agent module configured to
         receive instructions for execution, wherein the execution is performed using the source VM; and
         execute the received instructions resulting in modifications of the source VM, wherein the virtualization snapshot stores modified portions of the source VM separate from the source VM, the execute causing the virtualization agent module to:
            determine whether execution of the received instructions causes modification of a data block of the source VM; and
            store a modified data block on the system separate from the source VM responsive to determining that the execution of the received instructions causes modification of the data block; and
      a server communication module configured to
         send the modified portions of the source VM to a remote system comprising a destination VM, wherein the remote system applies the modified portions to the destination VM to obtain a modified destination VM that matches the modified source VM.

17. The system of claim 16, wherein the a virtualization agent module is further configured to:
   determine a first hash value based on the source VM before taking the virtualization snapshot;
   determine a second hash value based on an original version of the source VM stored by the virtualization snapshot responsive to execution of the received instructions;
   compare the second hash value with the first hash value; and
   report an error responsive to determining a mismatch between the second hash value and the first hash value.

18. The system of claim 16, wherein the server communication module is further configured to:
   receive the source VM from the remote system prior to taking the virtualization snapshot of a source VM.

19. The system of claim 18, wherein the remote system performs a conversion of the modified destination VM to a format compatible with the remote system.

20. The system of claim 16, wherein the modified portions comprise data blocks of the source VM that are modified as a result of executing the instructions.

\* \* \* \* \*